United States Patent
Warren-Hill

(10) Patent No.: US 9,625,802 B2
(45) Date of Patent: Apr. 18, 2017

(54) PROJECTION DISPLAY SCREEN AND PROJECTION METHOD FOR REPRESENTING IMAGES, IN PARTICULAR 3D MOVING IMAGES

(71) Applicant: Stuart Warren-Hill, Bristol (GB)

(72) Inventor: Stuart Warren-Hill, Bristol (GB)

( * ) Notice: Subject to any disclaimer, the term of this patent is extended or adjusted under 35 U.S.C. 154(b) by 0 days.

(21) Appl. No.: 14/635,175

(22) Filed: Mar. 2, 2015

(65) Prior Publication Data

US 2016/0259236 A1  Sep. 8, 2016

(51) Int. Cl.
| G03B 21/56 | (2006.01) |
| G03B 35/26 | (2006.01) |
| G03B 21/62 | (2014.01) |
| G02B 27/26 | (2006.01) |
| G03B 21/60 | (2014.01) |
| G03B 35/20 | (2006.01) |

(52) U.S. Cl.
CPC ............. *G03B 21/56* (2013.01); *G02B 27/26* (2013.01); *G03B 21/60* (2013.01); *G03B 21/62* (2013.01); *G03B 35/26* (2013.01); *G03B 35/20* (2013.01)

(58) Field of Classification Search
CPC ......... G03B 21/56; G03B 21/60; G03B 21/62
See application file for complete search history.

(56) References Cited

U.S. PATENT DOCUMENTS

| 2,130,704 A * | 9/1938 | Patzwaldt | G03B 21/565 |
| | | | 156/280 |
| 2,952,182 A | 9/1960 | Marks et al. | |
| 3,844,644 A * | 10/1974 | Martinez | G03B 21/60 |
| | | | 24/462 |
| 4,006,965 A * | 2/1977 | Takada | G03B 21/60 |
| | | | 359/443 |
| 5,865,519 A | 2/1999 | Maass | |
| 6,738,265 B1 | 5/2004 | Svarfvar et al. | |
| 7,554,730 B1 * | 6/2009 | Kuo | G03B 21/56 |
| | | | 359/443 |
| 2009/0268286 A1 * | 10/2009 | Wu | G03B 21/60 |
| | | | 359/443 |
| 2010/0053748 A1 * | 3/2010 | Rohner | G03B 21/62 |
| | | | 359/460 |

FOREIGN PATENT DOCUMENTS

| EP | 0800957 | 10/1997 |
| EP | 1148774 | 10/2001 |
| EP | 1319741 | 6/2003 |
| GB | 2512824 | 10/2014 |

OTHER PUBLICATIONS

Search Report relating to co-pending application No. GB1305615.5, dated Aug. 13, 2014.

* cited by examiner

*Primary Examiner* — Christopher Mahoney
(74) *Attorney, Agent, or Firm* — McCarter & English, LLP

(57) ABSTRACT

The present invention provides a woven textile projection display screen including a projection display region wherein the projection display region has two or more interwoven yarns and each yarn in the projection display region includes metal. The projection display region is optically transparent in use. The invention further includes a projection apparatus including the woven textile projection display screen and one or more projectors.

11 Claims, 3 Drawing Sheets

PROJECTION DISPLAY SCREEN AND PROJECTION METHOD FOR REPRESENTING IMAGES, IN PARTICULAR 3D MOVING IMAGES

FIELD OF THE INVENTION

The present invention concerns a projection display screen for displaying projected images, and apparatus for representing projected images, in particular for the representation of three-dimensional (3D) moving and floating images using projection apparatus. A method for the representation of such images is also disclosed.

BACKGROUND

There is currently a demand for apparatus which provides viewers with the illusion of 3D images which appear to exist and interact alongside real objects and people, or 'float' in open space. This is especially useful in concert performances and presentations, where impressive visual effects can enhance the viewing experience.

Apparatus are known which create illusions of 3D images interacting with real objects. For example EP0799436A1 describes an apparatus for representing moving images in the background of a stage or the like using an image source. The article to be represented is projected by the image source (projector) on to a reflecting surface parallel with the stage, and then undergoes secondary reflection in a transparent smooth foil angled at 45° to the audience in such a way that the image appears to the viewer on the background of the stage. The image observed is a flat two-dimensional (2D) image which simply produces the illusion of being 3D. This is an embodiment of the well-known "Pepper's Ghost" illusion. The viewing experience is deteriorated when, for example, the stage is viewed from an acute angle and the image no longer appears to represent its intended 3D form. Such apparatus is also expensive and difficult to implement because it requires a number of reflecting surfaces, high intensity and high definition projection means and high tension of the reflecting foil to ensure stable images.

Stereoscopy is a well-known effect used in cinema to produce the illusion of 3D images. Each eye of the viewer is presented with the same scene depicted from slightly different perspectives. One way to achieve this effect is to use a polarised 3D system, wherein light-polarising filters are used to produce two images of different polarisation. Filters worn by the viewer over each eye then allow the right eye to see one image and the left eye to see another, creating the stereoscopic 3D effect. In order for the effect to be convincing, the image intended for the left eye should be effectively 'blocked' by the right-eye filter, and vice-versa. If this is not achieved completely then the undesirable effect of 'ghosting' may be observed and the illusion is not complete. In polarised 3D systems, ghosting is avoided by ensuring that the polarisation of the reflected light is retained so that it may be effectively blocked by the viewer's eye filters.

Existing 3D projection screens use screens which are painted with a metal-containing paint so that reflected light retains its original polarisation. This avoids ghosting and the illusory effect is more impressive than regular 2D projection, but the viewer is aware that they are watching a projected image and the illusory effect is thereby limited.

The present invention provides a projection screen, projection apparatus and projection method. These provide the viewer with an enhanced viewing experience, creating the illusion of images, in particular 3D images, which may exist alongside and interact with real objects. The present invention provides apparatus which is lightweight, low-cost and easy to transport and install. The use of a stereoscopic projection system to represent 3D images provides an enhanced visual effect by providing the viewer with binocular depth cues rather than the more inferior monocular depth cues provided by existing apparatus such as disclosed in EP0799436A1. Furthermore, the particular projection screen used may provide the illusion that the 3D images are 'floating', in other words existing alongside real objects, creating an impressive visual experience for the viewer.

THE INVENTION

According to a first aspect, the present invention provides a woven textile projection display screen comprising a projection display region on a projection display side of the display screen, wherein the projection display region has two or more interwoven yarns and each yarn in the projection display region includes metal, and wherein the projection display region is, in use, optically transparent.

Projection Display Region

According to the present invention, the projection display screen has a projection display region. The projection display region is the area of the projection display screen upon which images will be projected, or the area suitable for displaying projected images. The projection display region is on a projection display side of the projection display screen. The projection display side is the side of the screen onto which images are projected, or which is suitable for displaying projected images.

The projection display screen has a projection display side. On the other side is a backing side. The backing side may have one or more materials, such as fabric, adhered to the yarns of the projection display region. The laminate must allow the projection display screen to be optically transparent in use. In preferred embodiments, the yarns of the projection display region form the backing side of the display screen. In other words, no material is adhered onto the yarns of the projection display region. In these embodiments, the backing side may also have a projection display region if the yarns containing metal also provide reflectance of polarised light from the backing side. For example, yarns with a metal outer surface surrounding the majority of the circumference of the yarn may provide a projection display screen with a projection display region on both the projection display side and the backing side of the projection display screen.

The projection display region is preferably the whole projection display screen. This creates simplicity in manufacture and means that image quality is not compromised. Alternatively, the projection display region may be a fractional part of the whole projection display screen.

According to the present invention, the projection display region of the projection display screen is optically transparent. 'Optically transparent' in the context of the present invention means that under certain lighting conditions the screen transmits enough light that it appears nearly or completely invisible to an ordinary viewer. For example, when the ambient light falling on the projection display side of the screen is at a lower level than that falling on the opposite rear side, the screen may appear to be invisible. The transparency is preferably achieved by the fabric weave of the display.

For example, when the area behind the screen is illuminated during front-projection, the viewer sees both the scene behind the screen due to the transparency of the screen material, and the images reflected by the screen. The resulting effect is that the viewer observes what is perceived as images floating within the vicinity of the objects surrounding the screen.

The size of the projection display screen of the present invention is not particularly limited and may vary depending on the intended use and intended venue.

The thickness of the screen of the present invention is not particularly limited, but the screen should be of such a thickness as to maintain transparency during appropriate lighting conditions.

Weave of the Woven Textile

According to the present invention, the projection display screen is a woven textile projection display screen. The type of textile used to make the screen is not particularly limited. The textile is preferably a woven tulle fabric. Such materials can be made to appear transparent under certain lighting conditions due to the nature of the yarns and weave. Even more preferably the textile comprises a bobbinet weave. This particular type of tulle textile demonstrates superior optical transparency under appropriate lighting conditions. However, any other suitable weave may be used provided that the necessary transparency condition is fulfilled. The dimensions of the weave are not particularly limited. Different weave dimensions may be required depending on the intended use of the projection display screen. For example, a larger screen or an outdoor screen may comprise a larger weave size. A larger weave may help to stabilise the screen during adverse wind and weather conditions.

The method of producing the textile for use in the projection display screen of the present invention is not particularly limited; however machine manufacture is preferred for reasons of cost and efficiency. For example, when bobbinet is used as the material a bobbinet machine may be used to weave the separate yarns into the finished textile. The metal-including threads are preferably produced before the weaving process is conducted. Coating or plating of the threads after textile manufacture is not preferred because this may lead to the blocking of the holes defined by the weave, which would reduce the transparency of the material and reduce the visual effect of the invention.

Metal-Containing Yarns

According to the present invention, each yarn in the projection display region of the projection display screen includes metal. When not all yarns of the projection display region include metal, undesirable ghosting effects are observed during 3D polarisation projection. Ghosting effects are significantly reduced and excellent image quality is possible when all yarns of the projection display region include metal. The metal containing yarns of the screen of the present invention are such that the polarisation of light reflected from the screen is retained. When the screen is used with a front-projection polarised 3D system, the image quality received by the viewer is excellent and ghosting effects are significantly reduced. These images may be stationary or may be moving images when video projection is used.

The particular yarns used in the present invention are not particularly limited. Preferably the projection display region includes nylon yarns. Even more preferably all of the yarns in the projection display region are nylon yarns. This allows simplicity and cheapness of manufacture. Nylon yarns also offer superior strength capabilities, increasing the durability of the display screen. However, some or all of the yarns may comprise nylon, acrylic, polyester, polyamide, polypropylene, polyethylene or any other synthetic yarn which further includes metal. Alternatively, Kevlar yarns may be used for reasons of enhanced strength and durability. The projection display region may also comprise natural yarns. For example, cotton, wool, linen, silk or hemp yarns may be used. The yarns may be metal coated nylon or any other metal coated yarn.

The yarns may also be essentially metallic threads with no synthetic core. However, this is less preferred for reasons of cost and lightness of material.

When a bobbinet weave is used to produce the textile for the display screen of the present invention, both the warp and weft yarns of the weave include metal therein. The warp and weft yarns may both be the same synthetic metal-including yarn, or may be different. When the textile comprises a bobbinet weave, the warp and weft yarns may both be metal coated nylon. The denier of the yarns of the present invention is not particularly limited.

Preferably the metal which must be included in the yarns is a conductive metal. Preferably the metal gives rise to the effect of retaining the polarisation of light reflected from the projection display region of the screen. Even more preferably the metal is silver metal. Silver metal has good conductivity and retains the polarisation of light reflected from the screen more effectively, reducing ghosting effects. However, aluminium metal, platinum, nickel or titanium may be included in the yarns. Any other suitable metal may also be used.

The way in which the metal is incorporated into the yarns is not particularly limited. Preferably each yarn in the projection display region has a metal outer surface. Even more preferably each yarn in the projection display region includes a metal coating or plating. A metallic coating or plating on the surface of the yarns is preferred because retention of polarisation of projected light is enhanced and ghosting effects are minimised. When a metal coating is used, the thickness of the coating is not particularly limited. Preferably the coating has a thickness of from 1 to 100 µm. Alternatively, a pure-metal yarn may be used. This would provide the reduced ghosting advantage but also carry the disadvantage of increased expense of manufacture and increased weight of the yarn.

As will be evident from the above, a preferred option is a projection display region comprising silver metal coated nylon yarns.

Projection Apparatus

According to a second aspect, the present invention provides a projection apparatus comprising the woven textile projection display screen of the first aspect of the present invention and further comprising one or more projectors. The projection apparatus allows the representation of images when light is projected from the projecting means onto the projection display region of the screen.

These images may be 2D or 3D images. The images may be stationary or moving. Preferably the images are moving images. Even more preferably the images are 3D moving images. This provides an enhanced visual effect. When the correct ambient lighting conditions are used the illusion of 'floating' images which appear to exist alongside and within their real surroundings can be created.

Projectors

The projection apparatus of the present invention comprises one or more projectors. Preferably the projection apparatus is a polarised 3D projection apparatus. This allows the apparatus to be used to represent 3D images to a viewer. When the projection apparatus is a polarised 3D projection apparatus the one or more projectors comprises one or more polarising filters. This allows the 3D effect to be observed.

Alternatively, the projection apparatus may be a 2D projection apparatus. This is less preferred because the visual experience is less impressive.

Preferably the projection apparatus includes two projectors, each of those projectors comprising a polarising filter. This is a relatively simple way of producing a 3D effect by the projection of one image from each projector, and is known as passive 3D projection. When there are two projectors, the filters provide the light from each of them with different polarisation. This allows simple separation of the images into right-eye and left-eye images to provide the 3D effect when passive polarised filter glasses are used by the viewer.

Alternatively, the projection apparatus may comprise a single projector. This may be a single projector comprising a switchable polarising filter which projects video consisting of consecutive images of alternating light polarisation, with the result being that 3D images can be produced. This is less preferred for reasons of cost. This type of system is known as active 3D projection and requires the use of active shutter polarised glasses, which increases the cost of the apparatus and makes implementation more difficult.

Preferably the projector is a single DLP or LCD video projector. When there is more than one projector, preferably at least one of the projectors is a single DLP or LCD video projector, more preferably all of the projectors are single DLP or LCD video projectors.

Projection Display Screen

The projection display screen is preferably held relatively flat during use and may be attached to a bar, truss or rod at the top edge of the screen. The bar, truss or rod allows the screen to be held in an extended, planar configuration and to be suspended in space with empty regions in front of and behind the screen. Then lighting effects may be used to enhance the visual experience and provide the illusion of 3D images interacting with real objects positioned in front of and/or behind the screen. The screen may also be attached to a bar, truss or rod at the bottom edge of the screen. This will provide further assistance in ensuring the flat configuration of the screen during use. Alternatively, the screen may be suspended from wires attached to the screen by means of eyelets or other attachment means. The eyelets may be present at each corner of the screen or a plurality of eyelets may be present along one or more of the screen edges.

Polarising Filters

Preferably the polarising filters are linear or circular polarising filters. Even more preferably linear polarising filters are used. Linear polarising filters allow all of the effects of the present invention to be achieved while keeping the apparatus low-cost. Alternatively, circular polarising filters may be used. An advantage of circular polarisation is that the 3D effect is maintained even when the head of the viewer is tilted, an effect which is not observed when linear polarising filters are used.

Polarising Glasses

Preferably the projection apparatus further comprises glasses for wearing by the viewer of the display screen, wherein the glasses comprise polarising filters which correspond to the type and orientation of the polarisation of the projected light. During the use of the invention for 3D polarisation projection, it will be preferable for viewers to wear a pair of polarised glasses. For example, when two projectors are used with circular polarising filters, one projector filter may provide projected light with opposite polarisation to the other. The user should wear glasses wherein the two lenses have mutually opposite polarising filters. The user will then see the image from one projector with one eye and the image from the other projector with the other eye. A stereoscopic effect is created when the images are of the same scene, taken from a slightly different perspective and correctly offset from one another. When the apparatus further comprises glasses for wearing by the viewer, the result is that the viewer sees stereoscopically enhanced 3D images from the screen of the present invention due to the polarisation retention properties of the screen, with the illusion that these images are 'floating' among their surroundings due to the high transparency of the screen of the invention.

Use of the Projection Apparatus

According to a third aspect of the invention, there is provided a use of the projection apparatus of the second aspect of the invention to represent three-dimensional images.

Method of Representing Images

According to a fourth aspect of the invention, there is provided a method of representing images comprising projecting light onto the projection display region of the projection display screen of the first aspect of the invention using the projection apparatus of the second aspect of the invention.

DETAILED DESCRIPTION OF EMBODIMENTS

These proposals are now illustrated by description of examples, with reference to the accompanying drawings in which.

Figure 1:
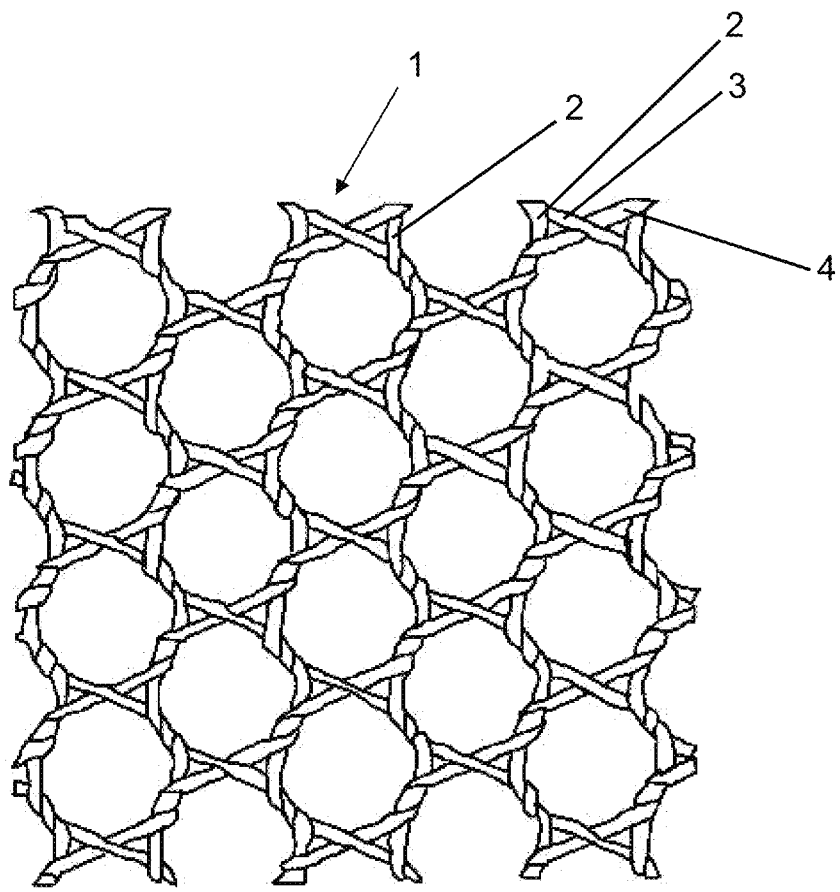
FIG. 1 is a front-on view of an embodiment of the woven textile projection display screen showing the weave of the yarns.

FIG. 1 shows an example of a suitable woven textile 1 for use in producing the projection display region of the screen of the present invention. In this particular embodiment, the textile comprises a bobbinet weave. In this type of weave, warp yarns 2 are woven with weft yarns 3 and 4. In the figure, the warp yarns 2 extend in the same plane as each other. Weft yarns 3 and 4 are looped around the warp yarns diagonally and extend at an angle of approximately 45° to the warp. The warp and weft yarns lie in approximately the same plane of the screen. The warp yarns bisect the angle made between the weft yarns 3 and 4. The result is a substantially planar mesh wherein openings defined by the yarns have a near hexagonal structure. In this particular embodiment, both the warp and weft yarns consist of silver coated nylon. The silver coated nylon is produced before being woven into the finished textile. Such a textile is produced using a bobbinet machine. Other similar weaving machines may be used. Various modifications will be apparent to those skilled in the art. For example, other textiles may be used for the purpose of the invention, with a different type of yarn such as cotton, acrylic or polyester; a different metal included in the yarn such as aluminium or copper; or a different type of weave.

Figure 2:
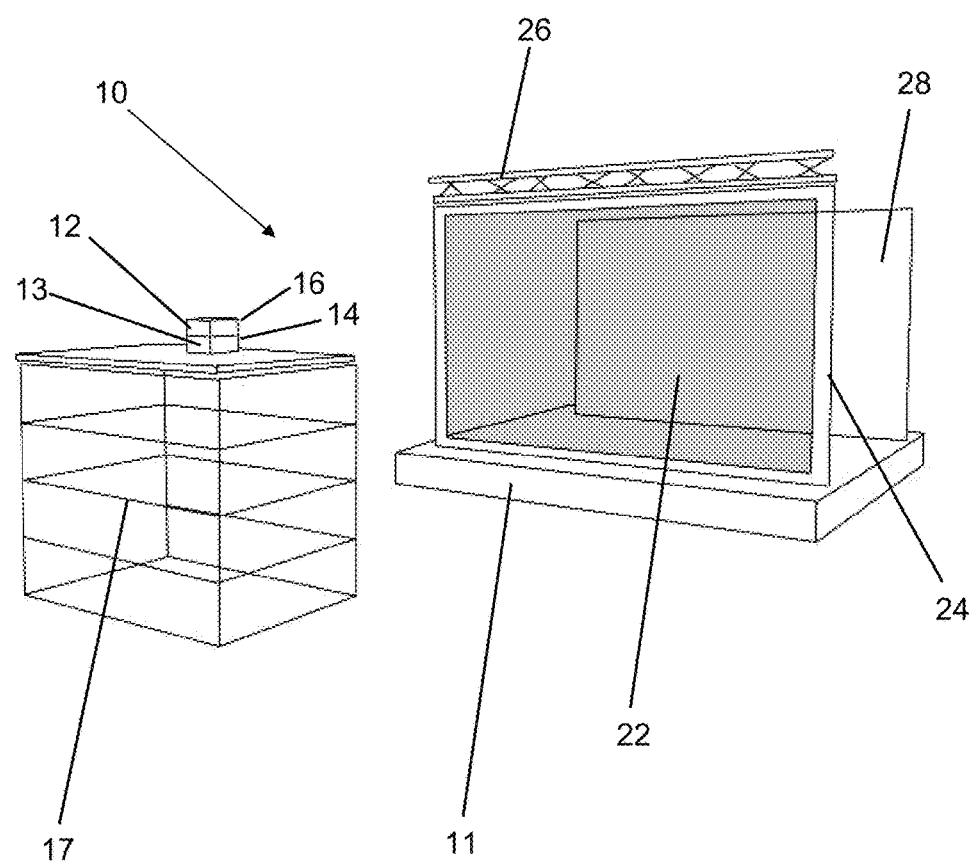
FIG. 2 is a perspective view of an embodiment of the projection apparatus assembled in one suitable arrangement for projection.

FIG. 2 shows the projection apparatus 10. The projection apparatus includes two projectors 12 and 13, supported on a stand 17 and in this case arranged one above the other. The projectors can be Digital Light Processing (DLP) or Liquid Crystal Display (LCD) type projectors. The projectors each include a polarising filter 14, 16 at the front of the lens through which the projected light passes. In this embodiment the filters are linear polarising filters, but circular polarising filters could easily be used instead.

Filter 14 provides light with a polarisation opposite to that provided by filter 16. Filters 14 and 16 may both be linear polarising filters, or may both be circular polarising filters.

The two projectors project images onto the projection display region 22 of the projection display screen 24. The images are of the same scene from slightly different perspectives, and they are offset from each other an appropriate amount in order to create the stereoscopic effect. One of these images is projected by projector 12 and the image is projected by the projector 13.

The projection display screen 24 is suspended from support bar 26 along the upper edge of the screen. Set back from the screen and parallel thereto is a black screen 28. This may be a black drape suspended from a bar similar to bar 26. When the apparatus is in use, the area between the projection display screen and the black screen and above the stage 11 is appropriately lit to enhance the illusion that projected 3D images are 'floating' within their surroundings because the light beams are visible through the transparent screen and the 3D images appear to hover in front of them.

Various modifications of the apparatus setup will be evident to those skilled in the art. For example, for the purposes of the invention, the number of projectors employed could vary. If 3D projection is required this is possible with only one projector having a switchable polarising filter. Alternatively, 2D projection may be required in which case a single projector may be used in the absence of a filter.

Figure 3:
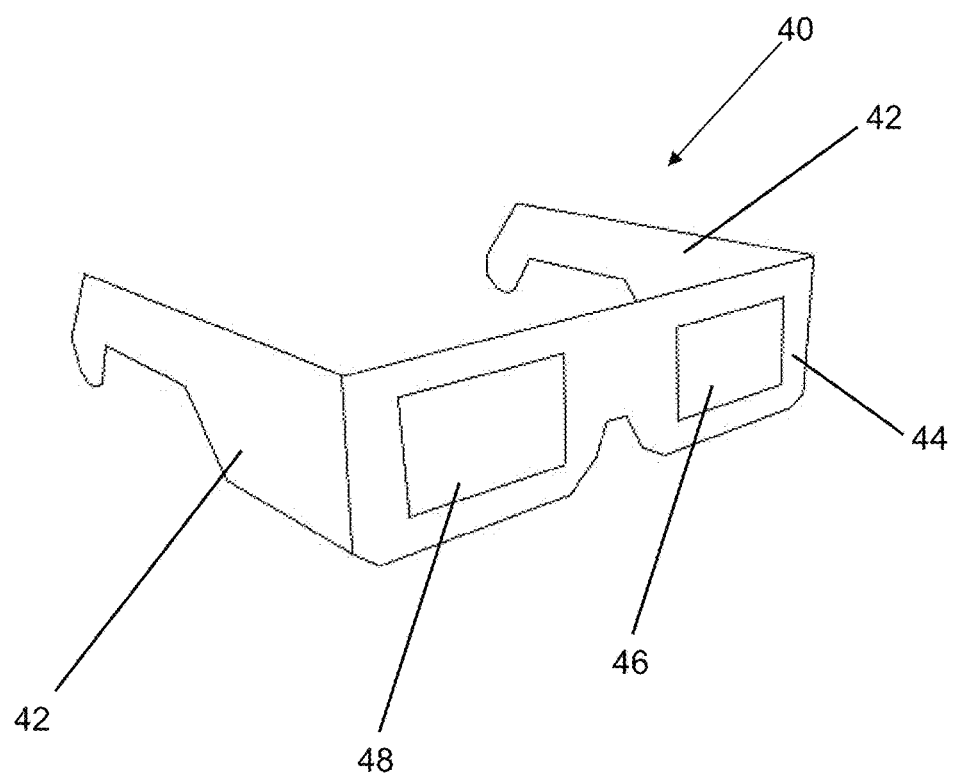
FIG. 3 is a perspective view of an embodiment of the pair of polarising glasses for wearing by the viewer of the projection display.

FIG. 3 shows a pair of polarising glasses 40 which may be worn by viewers of the projection display screen during use of the projection apparatus. The glasses comprise arms 42 and front piece 44, which in this case are formed from a single piece of folded material. The material may be plastic, card or any other suitable material. Within apertures defined by the front piece are polarising filters 46 and 48. Filter 46 has a different polarising ability to filter 48. The polarisation of the filters corresponds to the polarisation of the projected light reflected from the projection display region. For example, filter 46 may allow light from one projected image to pass through but will block light from the other image. Then filter 48 will allow light from the latter image but block light from the former. The result is a stereoscopic 3D effect for the viewer due to the binocular cues created by the two images. Such glasses are not necessary during 2D projection.

The invention claimed is:

1. A woven textile projection display screen, comprising:
   a projection display region on a projection display side of the display screen, wherein:
   the projection display region has two or more interwoven yarns and each yarn in the projection display region includes a metal coating or plating,
   wherein the projection display region is, in use, optically transparent,
   and
   the textile material of the projection display region comprises a bobbinet weave.

2. The woven textile projection display screen of claim 1, wherein the metal is silver metal.

3. The woven textile projection display screen of claim 1, wherein the projection display region consists of nylon yarns.

4. A projection apparatus, comprising the woven textile projection display screen of claim 1 and further comprising one or more projectors.

5. The projection apparatus of claim 4, wherein the projection apparatus is a polarised 3D projection apparatus and the one or more projectors comprises One or more polarising filters.

6. The projection apparatus of claim 5, wherein there are two projectors and each of those projectors comprises a polarising filter, and wherein the filters provide the light from the two projectors with different polarisation.

7. The projection apparatus of claim 5, wherein the polarising filters are linear or circular polarising filters.

8. The projection apparatus of claim 5, further comprising glasses for wearing by the viewer of the display screen, wherein the glasses comprise polarising filters which correspond to the type and orientation of the polarisation of the projected light.

9. The projection apparatus of claim 4, wherein the projection display screen further comprises a bar or truss attached thereto for suspending the screen.

10. The projection apparatus of claim 4, wherein the one or more projectors is one or more DLP or LCD projectors.

11. A method of representing images, comprising projecting light from One or more projectors onto a projection display region of the woven textile projection display screen of claim 1.

* * * * *